UNITED STATES PATENT OFFICE.

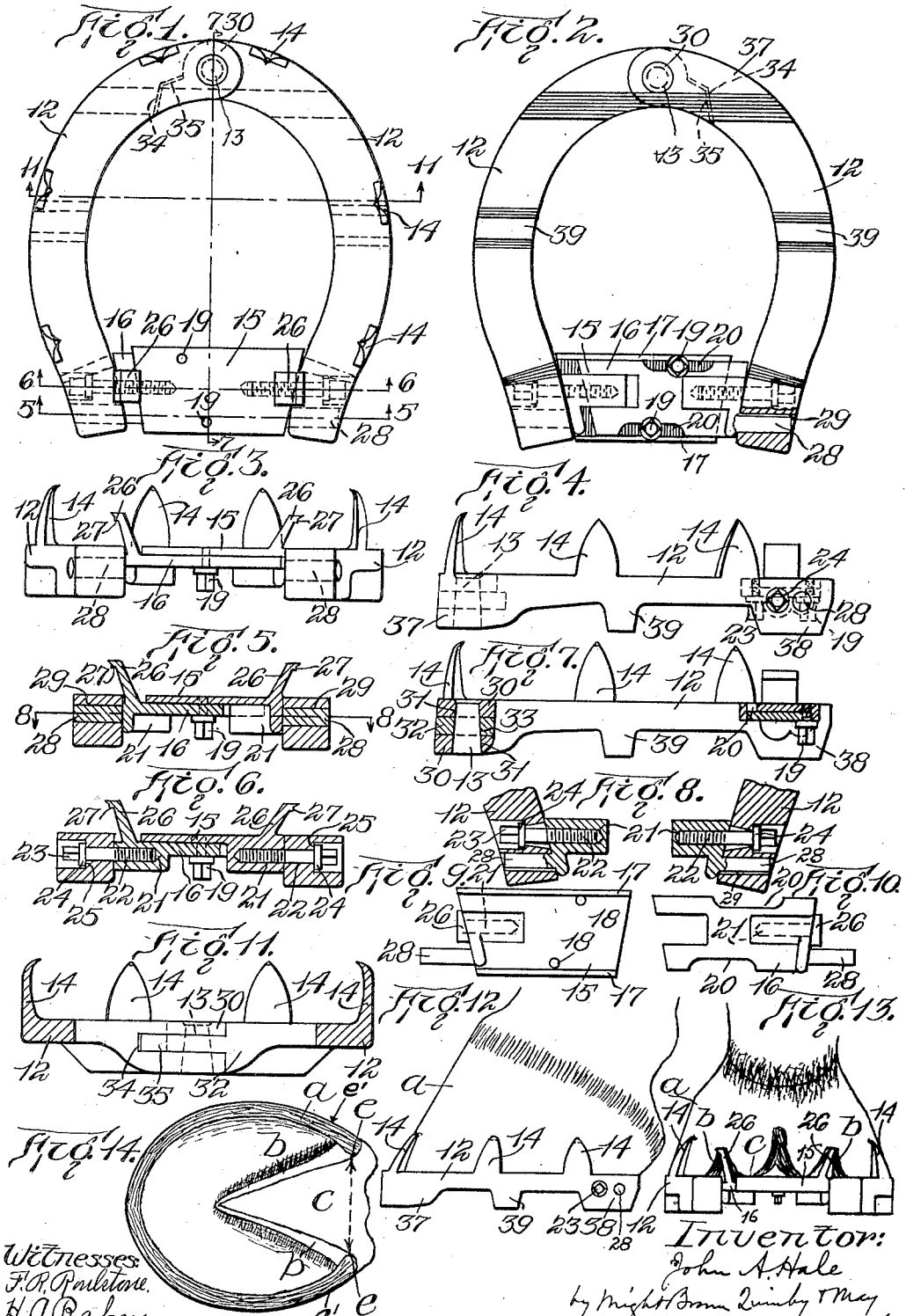

JOHN A. HALE, OF BOSTON, MASSACHUSETTS, ASSIGNOR TO THE SUCCESS NAILLESS HORSESHOE COMPANY, OF PORTLAND, MAINE, A CORPORATION OF MAINE.

NAILLESS HORSESHOE.

1,087,877.            Specification of Letters Patent.        Patented Feb. 17, 1914.

Application filed November 1, 1913. Serial No. 798,692.

*To all whom it may concern:*

Be it known that I, JOHN A. HALE, a citizen of the United States, and a resident of Boston, in the county of Suffolk and State of Massachusetts, have invented certain new and useful Improvements in Nailless Horseshoes, of which the following is a specification.

This invention relates to horseshoes which are secured to the hoof without the use of nails, and it has for its object to provide a shoe, not only of nailless construction, but also adapted to expand the hoof to any extent that may be required in order to prevent injurious crowding of the frog and interference with its proper action.

The invention is embodied in the improved construction which I will now proceed to describe and claim.

Of the accompanying drawings:—Figure 1 represents a top plan view of a horseshoe embodying my invention. Fig. 2 represents a bottom plan view of the same. Fig. 3 represents a rear end view. Fig. 4 represents a side or edge view. Fig. 5 represents a section on line 5—5 of Fig. 1. Fig. 6 represents a section on line 6—6 of Fig. 1. Fig. 7 represents a section on line 7—7 of Fig. 1. Fig. 8 represents a fragmentary section on the plane of line 8—8 of Fig. 5. Figs. 9 and 10 represent plan views of the members of the extensible bar hereinafter referred to. Fig. 11 represents a section on line 11—11 of Fig. 1. Fig. 12 represents a side view and Fig. 13 represents a rear view of the hoof provided with a shoe embodying my invention. Fig. 14 represents a bottom plan view of a horse's hoof without a shoe.

The same reference characters indicate the same parts in all the figures.

The bottom of a horse's hoof presents the appearance represented by Fig. 14, the outer wall *a* of the hoof joining the rear ends of the ribs *b, b* which constitute the frog frame between which the frog *c* is located. My improved shoe hereinafter described is provided with means for engaging the inner sides of the frog frame at the heel portion of the hoof and thus expanding the hoof to the proper proportions, such means constituting an important and chief characteristic of my invention.

The drawings represent a shoe composed of two body members 12, hinged together at the toe portion, the hinge pin being shown at 13 and the hinge being of such construction that the heel ends of the members 12 are adapted to swing toward and from each other. The hinge includes the novel features of construction which I will describe more fully hereinafter.

The upper side of the shoe is provided with upstanding spurs 14 adapted to be bent inwardly and engage the external surface of the wall of the hoof, said spurs being practically at right angles with the shoe prior to its attachment to the hoof, and being bent inwardly after the application of the shoe to the hoof, as indicated by Figs. 12 and 13.

Between the heel ends of the members 12 is interposed an extensible bar which is engaged with the said heel ends and is adapted to engage the inner sides of the frog frame at the heel portion thereof so that when the bar is elongated its elongation will expand the hoof.

The bar is preferably composed of two members 15 and 16 shown separately by Figs. 9 and 10. These members are slidable upon each other. The member 15 is provided at its opposite edges with raised ribs or guides 17 between which the longitudinal edges of the member 16 are movable. The member 15 is also provided with tapped orifices 18 adapted to receive set screws 19, the heads of which are adapted to bear on the under side of the member 16 at opposite edges thereof, the member 16 having recesses 20 which accommodate the set screws 19 and permit sliding movements of the bar members relatively to each other. When the set screws are loosened, the bar members 15 and 16 are freely movable to vary the length of the bar, and when said screws are tightened, they clamp the two members firmly together and hold the bar at the desired adjustment or elongation.

Each of the members 16 and 17 is provided with a tapped socket 21 extending inwardly from its outer end. The heel portion of each of the body members 12 is provided with an adjusting screw 22, said screws being journaled in sockets or bearings formed for their reception in the members 12 and provided with heads 23 adapted to be engaged by a wrench, and with flanges 24 bearing on shoulders 25 in said sockets. The threaded portions of the screws 22 engage the tapped orifices 21 in the bar members and are adapted, when the set screws 19 are loosened, to move the bar members 15 and 16 in opposite directions and thus elongate the bar. The bar members are provided on their upper sides with upwardly projecting spurs or ears 26 which are adapted to engage opposite sides of the frog frame $b$ at substantially the points indicated by the reference letters $e, e$ in Fig. 14. Said spurs are preferably sharpened at their upper ends and adapted to embed themselves in the sides of the frog frame so that when the bar is elongated, the spurs 26 exert pressure on the frog frame tending to expand the hoof. The frog frame engaging ends of the spurs 26 are preferably provided with shoulders 27 below the penetrating edges, said shoulders limiting the penetration of the frog frame by the spurs and preventing the spurs from entering too deeply.

The outer ends of the bar members 15 and 16 are provided with outwardly projecting steady pins 28 which enter sockets 29 (Fig. 5) formed for their reception in the heel end portions of the shoe members 12, said steady pins being arranged to prevent the bar from turning on the adjusting screws 22. The sockets 29 which receive the steady pins are preferably oblong in cross section, so that the steady pins will not be caused to bind in said socket by expanding and contracting movements of the shoe sections 12.

The described shoe may be attached to a hoof as follows:—The spurs 14 being upright as indicated by Figs. 3, 4, 7 and 11, and the set screws 19 loosened, the operator applies the shoe to the bottom of the hoof, the latter having been suitably trimmed to prepare it for the shoe. The rear body spurs 14, or those nearest the heel ends of the body members 12, are located nearer the toe end of the shoe than the bar spurs 26, so that when the shoe is located on the hoof the rear body spurs bear on the hoof wall at points $e', e'$, Fig. 14, which are out of alinement with and forward of the points $e, e$ on which the bar spurs bear. When all the body spurs 14 bear against the lower edge of the hoof wall, the adjusting screws 22 are turned in the directions required to slide the bar members 15 and 16 in opposite directions and thus elongate the bar and cause the bar spurs 26 to exert expanding pressure on the frog frame at the points $e, e$. At the same time the rear body spurs 14 are pressed closely against the exterior of the hoof at the points $e', e'$ so that the hoof is confined against expansion between the last-mentioned points. It follows therefore that the hoof is expanded between the points $e, e$ by the outward pressure of the bar spurs at said points. It is advisable to limit the expansion caused by any one operation to about one-eighth of an inch. The bar having been suitably elongated, the set screws 19 are tightened to maintain the elongation and the expansion of hoof caused thereby. The spurs 14 are then bent inwardly, these spurs and the members 12 of the shoe being of malleable metal so that the spurs may be bent inwardly by blows of a hammer without heating the shoe. The shoe may be readily removed by disconnecting one of its members 12 from the bar by withdrawing one of the adjusting screws 22, the shoe being then adapted to be opened and removed. The hoof may be additionally expanded at any time by loosening the set screws 19 and turning the adjusting screws 22 to further elongate the bar. This operation may be repeated until the ends of the bar are brought into contact with the body members 12. I consider it good practice, when the hoof has been considerably contracted, to slightly expand the hoof at more or less frequent intervals, say once a week.

The hinge connecting the shoe members 12 is composed of two spaced apart ears 30 formed on one of the members, said ears having pin-receiving orifices 31 (Fig. 7), and a single ear 32 formed on the other member, said ear having a pin-receiving orifice 33. When the ear 32 is inserted between the ears 30, the orifices 31 and 33 are in alinement with each other, and receive the hinge pin 13. The member having the spaced ears 30 is provided with a recess 34 communicating with the space between the ears 30, and the single ear 32 is provided with a tongue 35 which enters said recess and bears closely against the sides thereof. The recess 34 and tongue 35 constitute means for reinforcing the hinge and relieving the pin 13 from bending or buckling strain. As indicated by dotted lines in Figs. 1 and 2 the recess is wider than the tongue and permits lateral play of the tongue so that the width of the shoe may be reduced from that shown by said figures, the maximum contraction of the shoe being reached only when the inner edge of the tongue 21 abuts against the inner edge of the recess.

The shoe may be provided with calks of any suitable construction and arrangement. I have here shown an elongated toe calk 37 formed on the meeting ends of the members 12, heel calks 38 formed on the heel ends of the members 12, and intermediate calks 39 between the calks 37 and 38, these intermediate calks being arranged to support the side portions of the shoe and prevent strain on the hinge pin.

I am the first, so far as I am aware, to provide a nailless expansible horseshoe with means for positively expanding the hoof. The advantages of this feature of my improved shoe are obvious without further explanation. It may be said in addition, however, that the construction which permits the expansion of the hoof also permits its contraction in case the hoof has been unduly expanded particularly at the toe portion, which is often the case. In contracting the expanded hoof, the operator first loosens the set screws 19, contracts or reduces the length of the bar and the distance between the spurs 26 so that the spurs do not closely engage the frog frame at the points *e, e,* then tightens the set screws to prevent further contraction of the bar, and finally operates the adjusting screws to force the shoe members 12 inwardly toward the ends of the contracted bar, thus causing the spurs 14 of said members to contract the hoof and press the frog frame at *e, e,* into engagement with the spurs 26.

I claim:—

1. A nailless horseshoe composed of body members hinged together at the forward portion of the shoe, and provided with means for engaging the exterior of the wall of a hoof, and an extensible bar interposed between and engaged with the heel ends of the body members and provided with means for engaging the inner sides of the rear portion of the frog frame of the hoof, means being provided for elongating said bar to simultaneously expand the hoof and shoe, and for holding the bar at any length to which it may be adjusted.

2. A nailless horseshoe composed of body members hinged together at the forward portion of the shoe, and provided with means for engaging the exterior of the wall of a hoof, an extensible bar composed of two members slidably engaged with each other, each member having on its upper side a spur adapted to engage the rear portion of the frog frame of a hoof and in its outer end a tapped socket, and adjusting screws journaled in the heel portions of the body members and engaging the tapped sockets, whereby the bar members may be adjusted to elongate the bar and expand the hoof and shoe, means being provided whereby the bar members may be rigidly connected to maintain any desired elongation of the bar.

3. A nailless horseshoe composed of body members hinged together at the forward portion of the shoe, and provided with means for engaging the exterior of the wall of a hoof, and an extensible bar composed of two members slidably engaged with each other and provided with means whereby they may be rigidly connected, each member having a spur for engaging the inner side of the frog frame of a hoof, a tapped socket extending inwardly from its outer end, and a steady pin projecting outwardly from its outer end, and adjusting screws journaled in the heel portions of the body members and engaging the tapped sockets, said heel portions being provided with orifices in which the steady pins are slidable.

In testimony whereof I have affixed my signature, in presence of two witnesses.

JOHN A. HALE.

Witnesses:
C. F. BROWN,
P. W. PEZZETTI.

---

Copies of this patent may be obtained for five cents each, by addressing the "Commissioner of Patents, Washington, D. C."